United States Patent
Kadowaki

(10) Patent No.: US 9,926,999 B2
(45) Date of Patent: Mar. 27, 2018

(54) VIBRATING ISOLATING DEVICE

(71) Applicant: YAMASHITA RUBBER KABUSHIKI KAISHA, Fujimino-shi, Saitama (JP)

(72) Inventor: Hirokazu Kadowaki, Fujimino (JP)

(73) Assignee: YAMASHITA RUBBER KABUSHIKI KAISHA, Fujimino-Shi (JP)

(*) Notice: Subject to any disclaimer, the term of this patent is extended or adjusted under 35 U.S.C. 154(b) by 0 days.

(21) Appl. No.: 15/102,942

(22) PCT Filed: Mar. 19, 2015

(86) PCT No.: PCT/JP2015/058373
§ 371 (c)(1),
(2) Date: Jun. 9, 2016

(87) PCT Pub. No.: WO2015/141809
PCT Pub. Date: Sep. 24, 2015

(65) Prior Publication Data
US 2016/0305505 A1    Oct. 20, 2016

(30) Foreign Application Priority Data
Mar. 19, 2014   (JP) .................... 2014-057305

(51) Int. Cl.
*F16F 15/08* (2006.01)
*F16F 1/36* (2006.01)
(Continued)

(52) U.S. Cl.
CPC ............ *F16F 15/08* (2013.01); *B60K 5/1216* (2013.01); *F16F 1/36* (2013.01); *F16F 1/387* (2013.01); *F16F 1/3849* (2013.01); *F16F 1/3863* (2013.01)

(58) Field of Classification Search
CPC ...... B60K 5/1208; B60K 5/12; B60K 5/1216; F16F 1/373; F16F 1/36; F16F 1/3849;
(Continued)

(56) References Cited

U.S. PATENT DOCUMENTS

| 5,556,071 A * | 9/1996 | Bellamy | F16F 13/1481 248/636 |
| 2005/0242481 A1* | 11/2005 | Ihara | F16F 1/373 267/141 |
| 2010/0059912 A1* | 3/2010 | Takakura | B60K 5/1208 267/140.12 |

FOREIGN PATENT DOCUMENTS

| JP | 09-303459 | 11/1997 | |
| JP | 2006177544 A * | 7/2006 | ............ F16F 1/3849 |

(Continued)

OTHER PUBLICATIONS

International Search Report, dated May 26, 2015 (May 26, 2015).

*Primary Examiner* — Robert A. Siconolfi
*Assistant Examiner* — San M Aung
(74) *Attorney, Agent, or Firm* — Rankin, Hill & Clark LLP

(57) ABSTRACT

A first mounting metal fitting is connected to an engine while a second mounting metal fitting is mounted on a vehicle body. A vibration isolating elastic body provides a connection between the first and second mounting metal fittings. Middle portions of opposed upwardly extending wall sections are formed in a concave curve surface, and expanded recess portions are provided between the opposed upwardly extending wall sections. A projecting section provided on the first mounting metal fitting is accommodated in the expanded recess portions. The projecting section overlaps with the expanded recess portions in the X direction so as to regulate the movement in the X direction of the first mounting metal fitting. The X direction elastic leg for regulating (Continued)

the movement in the X direction is not provided, so that the molding can be performed by demolding a molded object in the X direction.

12 Claims, 13 Drawing Sheets

(51) Int. Cl.
  *B60K 5/12* (2006.01)
  *F16F 1/387* (2006.01)
  *F16F 1/38* (2006.01)
(58) Field of Classification Search
  CPC ........ F16F 1/3863; F16F 1/387; F16F 3/0873;
  F16F 15/08; F16F 2203/007
  USPC ........................................................ 267/141
  See application file for complete search history.

(56) References Cited

FOREIGN PATENT DOCUMENTS

| | | | | |
|---|---|---|---|---|
| JP | 2006177544 A | * | 7/2006 | ............ F16F 1/3849 |
| JP | 2011-214626 | | 10/2011 | |
| WO | WO 2011148575 A1 | * | 12/2011 | ............ F16F 1/3732 |
| WO | WO-2011148575 A1 | * | 12/2011 | ............ F16F 1/3732 |

\* cited by examiner

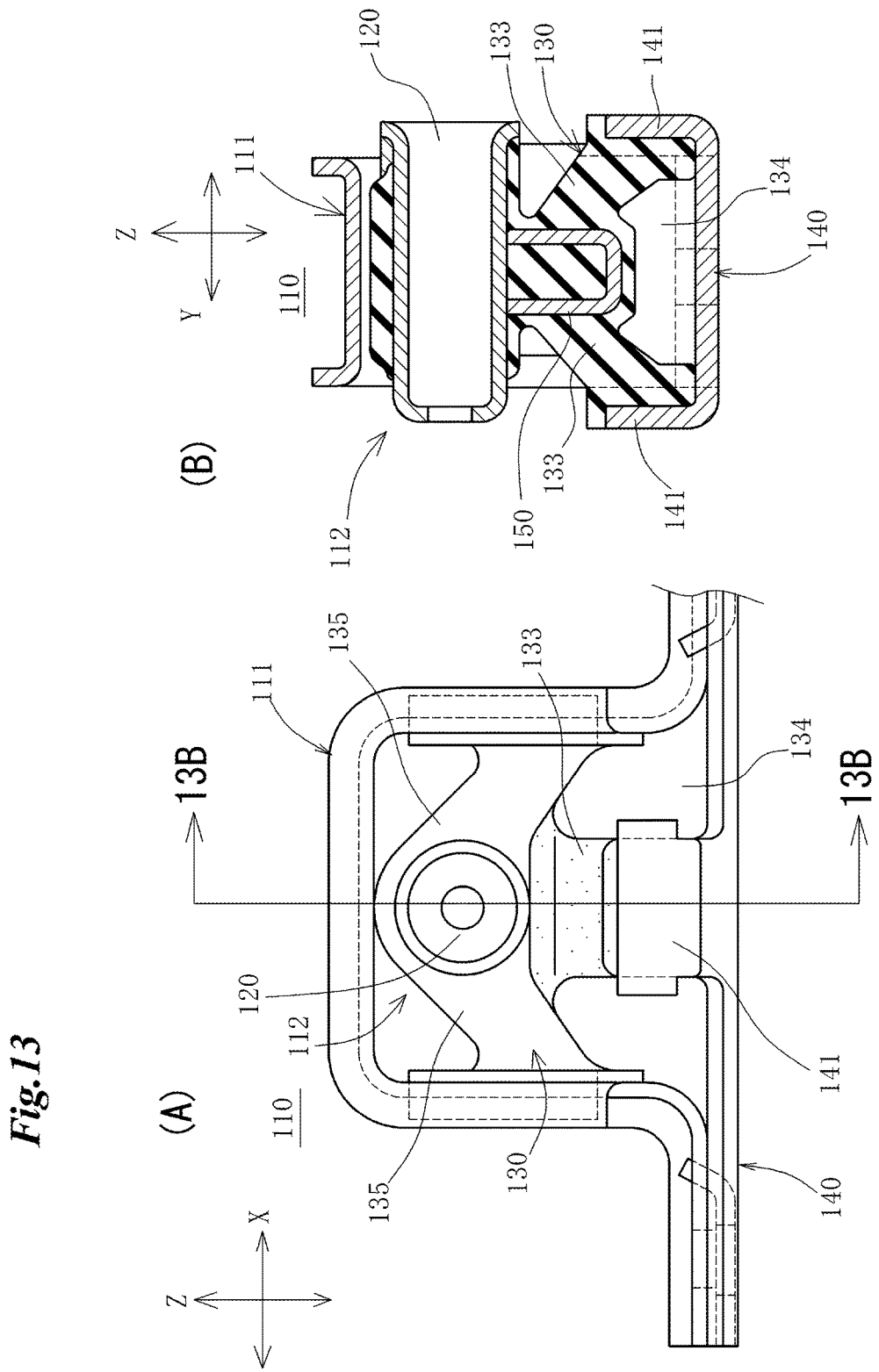

VIBRATING ISOLATING DEVICE

TECHNICAL FIELD

The present invention relates to a vibration isolating device for use with an engine mount for a motor vehicle, and the like.

BACKGROUND ART

An example of a prior art engine mount is shown in FIG. 13. In this drawing, (A) is a front view, and (B) is a cross sectional view taken on line 13B-13B of (A). This engine mount 110 includes a first mounting metal fitting 120 on which an engine is mounted, a second mounting metal fitting 140 to be mounted on a vehicle body, and a vibration isolating elastic body 130 providing a connection between the first mounting metal fitting 120 and the second mounting metal fitting 140.

Herein, a reference character Z is a direction in which a static load of the engine is applied to the first mounting metal fitting 120, X and Y are two orthogonal directions in a plane orthogonal to the direction Z, and the Y direction of the X and Y directions is a direction extending along a mounting axis of the first mounting metal fitting 120.

An outside stopper 111 is provided around the first mounting metal fitting 120 in such a way as to enclose the latter in substantially an inverted U-shape. Each end bent to the second mounting metal fitting 140 side overlaps with the second mounting metal fitting 140 and is integrally combined therewith, so that the outside stopper 111 intersects at right angles to the Y direction and is arranged to extend in a long way in the X direction. The outside stopper 111 and the first mounting metal fitting 120 are connected by X direction elastic legs 135.

A vibration isolating elastic body 130 is made of rubber or the like and formed with Y direction elastic legs 133 which extend in the Y direction in a bifurcated form and the X direction elastic legs 135 which extend in the X direction in a bifurcated form. The Y direction elastic legs 133 are spaced apart from the X direction elastic legs 135 in the Z direction.

As shown in FIG. 13(A), the X direction elastic legs 135 extend in the X direction in a chevron shape in a front view. The first mounting metal fitting 120 is combined integral with a middle portion of the X direction elastic legs 135. Each end of the X direction elastic legs 135 is integrally joined to each lateral portion of the outside stopper 111.

As shown in FIG. 13(B), a projecting member 150 which extends downwardly from the fist mounting metal fitting 120 is inserted into and integrally combined with a middle portion of the Y direction elastic legs 133. Each end portion of the Y direction elastic legs 133 is joined to and integrally combined with vertical wall sections 141 provided in the second mounting metal fitting 140. The vertical wall sections 141 are formed in pairs in opposite positions located at each end in the Y direction of the second mounting metal fitting 140, and bent upwardly together with the second mounting metal fitting 140.

A space 134 is formed in such a way as to be surrounded by the vibration isolating elastic body 130, the second mounting metal fitting 140 and the outside stopper 111. This space 134 is closed in the X direction by lateral portions of the outside stopper 111, which are opposed in the X direction, and closed in the Y direction by the vertical wall sections 141 which are opposed in the Y direction.

With this construction, a spring constant is set up by the X direction elastic legs 135 between the first mounting metal fitting 129 and the outside stopper 111, and the deformation in the X direction of the first mounting metal fitting 120 is able to be regulated by the outside stopper 111.

Further, when the first mounting metal fitting 120 and the projecting member 150 move in the Y direction, the Y direction elastic legs 133 are compressed between the vertical wall section 141 and the projecting member 150. Therefore, a spring constant in the Y direction on the side of the Y direction elastic legs 133 can be increased to a certain extent. If there are no vertical wall sections 141, the elastic legs 133 are subject mainly to the shear deformation, and the spring constant in the Y direction is decreased remarkably.

PRIOR ART REFERENCE

Patent reference 1: Japanese patent No. 3,723,633.

DISCLOSURE OF THE INVENTION

Problem to be Solved by the Invention

By the way, in the above prior art example, since the X direction elastic legs 135 are provided for forming the spring in the X direction, the outside stopper 111 has to be provided for supporting the X direction elastic legs 135. Moreover, this outside stopper 111 is an essential component for regulating the movement in the X direction of the first mounting metal fitting 120. However, when molding the vibration isolating elastic body 130, the outside stopper 111 makes the molding with a metal mold difficult.

Namely, the outside stopper 111 is previously assembled with the second mounting metal fitting 140 into a single unit, and the assembled unit is put into the metal mold. Then, the first mounting metal fitting 120 is arranged within a space (space containing the space 134) surrounded by the outside stopper 111 and the second mounting metal fitting 140, and thereafter a predetermined rubber material or the like is poured into the circumference of the first mounting metal fitting 120, so that the vibration isolating elastic body 130 is integrally molded.

In a state after molding, however, the X direction elastic legs 135 are connected to the outside stopper 111 in the X direction, and the Y direction elastic legs 133 are connected to the vertical wall sections 141 in the Y direction, so that the space 134 is closed partially in the X direction and the Y direction. Therefore, demolding is not able to be carried out simply in one direction, for example, in the Y direction, and a complicated split mold has to be used, whereby to make the molding difficult. Accordingly, the construction capable of making the manufacture easy is desired.

In addition, in the case where the outside stopper 111 is provided separately from the second mounting metal fitting 140, the whole device is increased in size and component parts are increased in number. Therefore, it is desirable to dispense with the outside stopper 111, and if the outside stopper 111 is provided, it is desirable that the vibration isolating elastic body 130 is not connected to the outside stopper 111.

The present invention has an objective of realizing the requirements as above.

Means for Solving the Problem

In order to solve the above subject, a vibration isolating device according to a first feature of the present invention comprises a first mounting metal fitting (20) to be mounted on one of a vibration source and a vibration receiving side, a second mounting metal fitting (40) to be mounted on the other of the vibration source and the vibration receiving side, a vibration isolating elastic body (30) providing a connection between the first mounting metal fitting (20) and the second mounting metal fitting (40), wherein, letting a direction of a static load applied to the first mounting metal fitting (20) be Z, and two mutually intersecting directions in a plane orthogonal to the Z be X and Y, and letting the Y correspond to a direction of a mounting axis of the first mounting metal fitting (20), the vibration isolating elastic body (30) has a pair of elastic legs (33) which extends in the Y direction in a bifurcated form from the first mounting metal fitting (20), and extending end portions of the elastic legs (33) are connected to upwardly extending wall sections (41) which are formed in end portions in the Y direction of the second mounting metal fitting (40), wherein the elastic legs (33) located on the first mounting metal fitting (20) side are connected to each other, and a projecting section (50) integrally projecting from the first mounting metal fitting (20) is inserted into a connecting section (32) of the elastic legs (33), and wherein the projecting section (50) is arranged between the pair of upwardly extending wall sections (41), and the second mounting metal fitting (40) is integrally provided with an X direction regulating means (44) for regulating a movement in the X direction of the projecting section (50).

According to a second feature of the present invention, in addition to the first feature, the X direction regulating means (44) is provided in pairs in an opposed relationship when viewed in the Z direction and overlaps with the projecting section (50) when viewed in the X direction.

According to a third feature of the present invention, in addition to the second feature, the X direction regulating means is formed with expanded recess portions (44) which expand outwardly in the Y direction, and the projecting section (50) is interposed between the expanded recess portions (44).

According to a fourth feature of the present invention, in addition to the third feature, a portion (32) of the elastic leg (33) is integrally provided at a periphery of the projecting section (50) interposed between the expanded recess portions (44).

According to a fifth feature of the present invention, in addition to the fourth feature, a spring adjustment recess (53) is provided on a lower surface (52) of the projecting section (50). This spring adjustment recess (53) is arranged in the Y direction and is open outwardly in the Y direction at a bottom side of the second mounting metal fitting (40), and a spring adjustment portion (32a) formed by being filled with a portion of the elastic leg (33) is located in the spring adjustment recess (53).

According to a sixth feature of the present invention, in addition to any one of the third to fifth features, the upwardly extending wall sections (41) are inclined in cross section in the Y direction such that a width in the Y direction between the expanded recess portions (44) is increased on an entering side of the projecting section (50).

According to a seventh feature of the present invention, in addition to any one of the third to fifth features, the upwardly extending wall sections (41) extend vertically in cross section in the Y direction such that a width in the Y direction between the expanded recess portions (44) is constant.

Effects of the Invention

According to the first feature of the present invention, since the second mounting metal fitting (40) is integrally provided with the X direction regulating means (44) for regulating the movement in the X direction of the projecting section (50), the movement of the first mounting metal fitting (20) can be configured to be regulated without provision of a separate outside stopper 111 (FIG. 13) as seen in an prior art example. Therefore, it is possible to dispense with an X direction elastic leg 135 (FIG. 13) connected to the outside stopper 111, and the vibration isolating elastic body (30) is required only to be connected to the second mounting metal fitting (40) in the Y direction, so that the manufacture at the time when the vibration isolating elastic body (30) is formed integral with the first mounting metal fitting (20) and the second mounting metal fitting (40) can be facilitated.

Moreover, since the X direction regulating means (44) is provided integral with the second mounting metal fitting (40), it is possible to dispense with the outside stopper 111 provided separately from the second mounting metal fitting (40). Therefore, the number of component parts can be reduced and the device can be decreased in size, whereby the assembly of the second mounting metal fitting (40) side can be facilitated.

According to the second feature of the present invention, since the X direction regulating means (44) is provided in pairs in an opposed relationship when viewed in the Z direction and overlaps with the projecting section (50) when viewed in the X direction, the movement in the X direction of the projecting section (50) can be regulated certainly.

According to the third feature of the present invention, the X direction regulating means is formed with the expanded recess portions (44) which expand outwardly in the Y direction. Therefore, even if the projecting section (50) interposed between the expanded recess portions (44) is moved in the oblique direction intersecting with the X and Y directions or either of the X direction or the Y direction, the movement can be regulated.

According to the fourth feature of the present invention, a portion (32) of the elastic leg (33) is integrally provided at the periphery of the projecting section (50) interposed between the expanded recess portions (44). Therefore, when the projecting section (50) is moved, the elastic legs (33) are compressed around the periphery of the projecting section (50) between the projecting section (50) and the expanded recess portions (44). Thus, since the compressive deformation is applied, the spring constant in the X direction can be increased.

According to the fifth feature of the present invention, the spring adjustment recess (53) is arranged on the lower surface (52) of the projecting section (50) in the Y direction. The spring adjustment recess (53) is open outwardly in the Z direction and the Y direction, and the spring adjustment portion (32a) formed continuously with the elastic leg (33) by being filled with portion of the elastic leg (33) is located in the spring adjustment recess (53). Therefore, since a free length of the elastic leg (33) is increased, the spring constant can be decreased with increase in the free length. The spring adjustment portion (32a) is hardly deformed with respect to the vibration in the X direction, and so the spring constant is not influenced. For this reason, the spring constants in the three directions of X, Y and Z can be adjusted by such a simple construction as to provide the spring adjustment recess (53) and to provide the spring adjustment portion (32a) in an interior of the spring adjustment recess (53).

According to the sixth feature of the present invention, since the upwardly extending wall sections (41) are inclined such that the width in the Y direction between the expanded recess portions (44) is increased on the entering side of the projecting section (50), the projecting section (50) can easily move forwardly and backwardly in the Z direction between the opposed upwardly extending wall sections (41).

According to the seventh feature of the present invention, since the upwardly extending wall sections (41) extend vertically, the width in the Y direction between the expanded recess portions (44) can be constant in the Z direction. Therefore, even if the projecting section (50) has such a simple vertical form as to be in face to face relationship with the upwardly extending wall sections (41), a space between the projecting section (50) and the upwardly extending wall sections (41) can be kept constant, and so the movement in the X direction can be regulated at a constant level.

BRIEF DESCRIPTION OF THE DRAWINGS

FIG. 13 is a view showing an engine mount of a prior art example.

BEST MODE FOR CARRYING OUT THE INVENTION

Hereinafter, an engine mount in accordance with a first embodiment will be described with reference to drawings.

Figure 1:
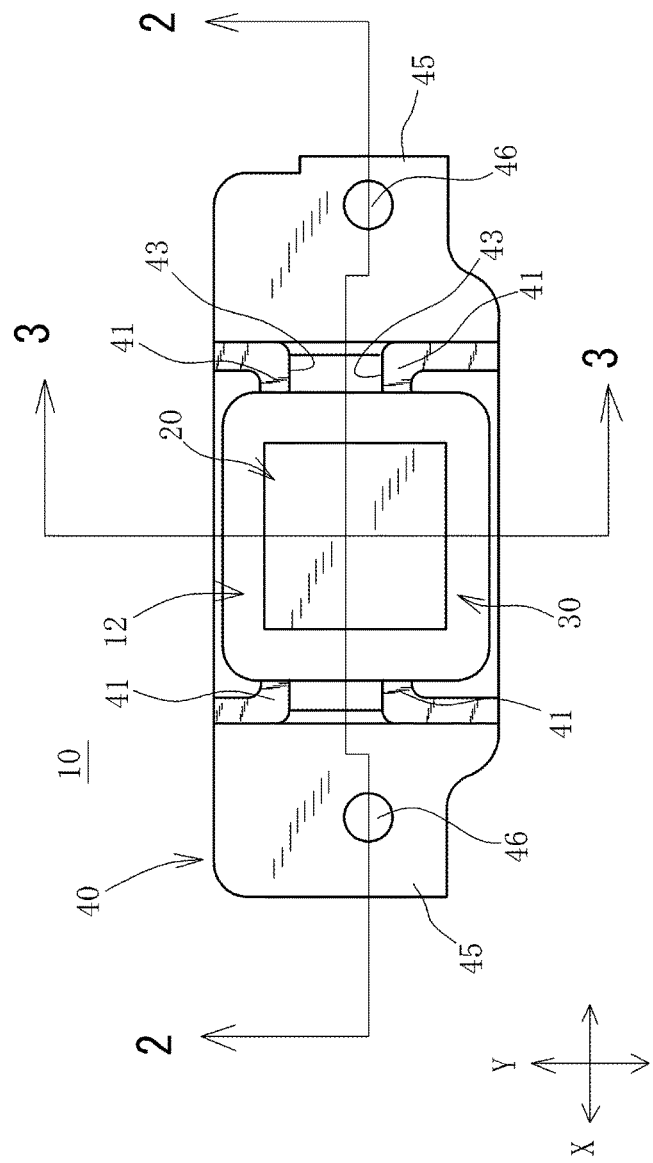
FIG. 1 is a top plan view of an engine mount in accordance with a first embodiment (FIGS. 1 to 8) of the present invention.

In the following description, an upward and downward direction of FIGS. 2 and 3 shall be an upward and downward direction (a Z direction) of the engine mount. Orthogonal biaxial directions in a plane intersecting at right angles to the Z direction shall be X and Y directions. As shown in FIG. 1, the X direction is a forward and backward direction, and the Y direction is a left and right direction, for example (however, the X direction may be optionally set as the left and right direction, and the Y direction may be optionally set as the forward and backward direction).

Orientations such as "upward", "downward", "left", "right", "forward" and "backward" correspond to each of upward, downward, left, right, forward and backward directions of a vehicle onto which an engine is loaded. In addition, the Z direction is also the direction in which a static load of the engine is applied to when the engine is loaded on the vehicle.

FIG. 1 is a top plan view of an engine mount 10. FIG. 2 is a cross sectional view taken on line 2-2 of FIG. 1. FIG. 3 is a cross sectional view taken on line 3-3 of FIG. 1. FIG. 4 is a perspective view of a mount main body part 12. The mount main body part 12 corresponds to a part removing an outside stopper 11 from a prior art engine mount 10.

This engine mount 10 is provided with the mount main body part 12. The mount main body part 12 is integrally formed with a first mounting metal fitting 20, a vibration isolating elastic body 30, and a second mounting metal fitting 40.

The first mounting metal fitting 20 is a member of rectangular cylindrical shape made of metal or resin. The engine not shown in the drawing is supported by the mount main body part 12 in such a manner that a bracket not shown in the drawing is inserted into and fixed in a cylindrical hole 21 which extends in the Y direction. When one end of the bracket is mounted on the first mounting metal fitting 20 and the other end thereof is mounted on the engine, the static load of the engine is imposed on the mount main body part 12 in the Z direction. The direction in which the bracket is inserted into the cylindrical hole 21 is a mounting direction A (FIGS. 3 and 4). This mounting direction A corresponds to (is in parallel with) the Y direction.

The vibration isolating elastic body 30 is a proper elastic material such as rubber or the like and is an elastic member functioning as a vibration isolating main body of the engine mount 10. The vibration isolating elastic body 30 provides a connection between the first mounting metal fitting 20 and the second mounting metal fitting 40 in the upward and downward direction by a proper method such as vulcanizing adhesion or the like. Below the first mounting metal fitting 20, the vibration isolating elastic body 30 is formed continuous with an elastic leg 33 on a lower side through a connecting section 32 of constricted neck shape. Moreover, the connecting section 32 is formed integral with and continuous with an elastic cover 31 located above the connecting section 32.

Figure 3:
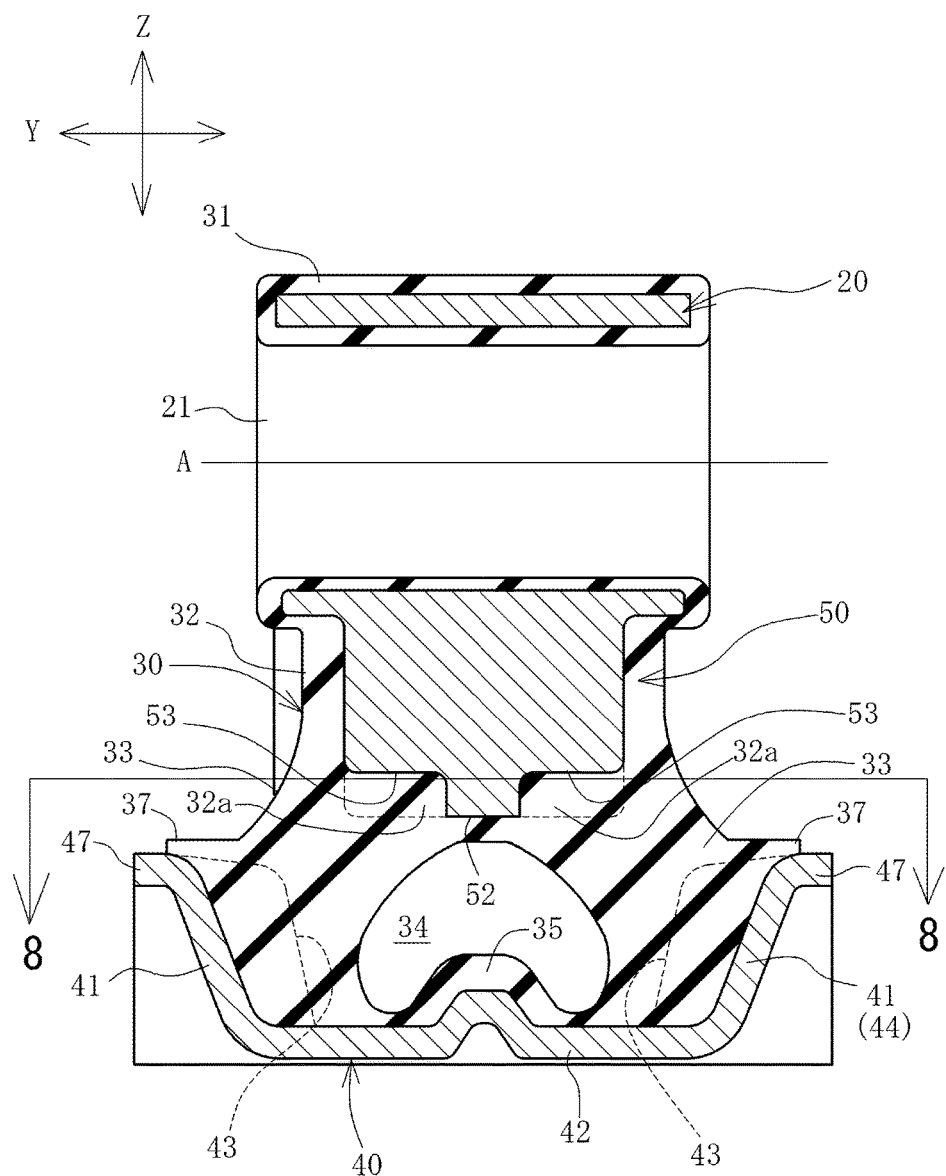
FIG. 3 is a cross sectional view taken on line 3-3 of FIG. 1.
Figure 4:
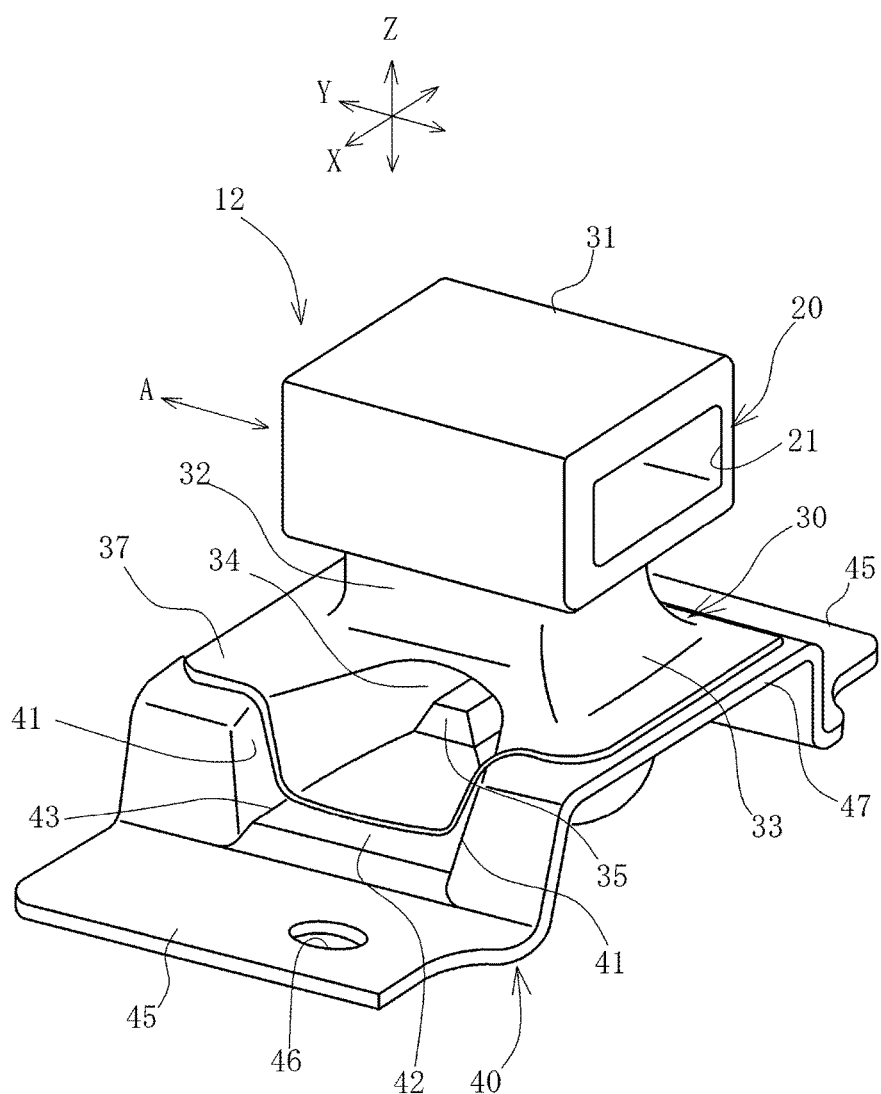
FIG. 4 is a perspective view of a main body part of the engine mount.

As clearly shown in FIG. 3, the elastic leg 33 extends to both sides in the Y direction in a downwardly spreading manner and is connected to upwardly extending wall sections 41 of the second mounting metal fitting 40. The upwardly extending wall sections 41 are inclined in opposite directions in such a way as to expand outwardly in the upward direction with approach toward each of end portions in the Y direction thereof. The lower end portion of the elastic leg 33 is connected to the upwardly extending wall sections 41.

Further, each of the upper end portions of the upwardly extending wall sections 41 is formed with an outward flange 47 which bends substantially horizontally outwardly in the Y direction, and the outward flanges 47 are covered with a portion of an end portion of the elastic leg 33.

The elastic leg 33 is formed in pairs in an opposed relationship, and a void 34 forming a space in the present invention is located between the pair of elastic legs 33. The void 34 is formed in a position located below a projecting section 50 such that it passes through a lower part of the vibration isolating elastic body 30 in the X direction. The void 34 is open in the X direction.

A lower stopper 35 projects into the void 34 from the lower side to the upper side. The lower stopper 35 is a low hill-shaped projecting member which projects toward a middle portion of the projecting section 50 and is formed by allowing a portion of a bottom section 42 to project upwardly and by covering a periphery of the upwardly projecting portion with an elastic cover portion which is formed continuously and integrally with the elastic legs 33. The elastic cover portion is integrally combined with the bottom section 42 of the second mounting metal fitting 40 together with the lower end portions of the elastic legs 33.

Further, a lower cover 37 is formed continuously and integrally with a lower part of the elastic leg 33. The lower cover 37 is a cover member which covers opposed surfaces of the upwardly extending wall sections 41, the outer flanges 47 and the bottom section 42 (see FIG. 4).

Figure 5:
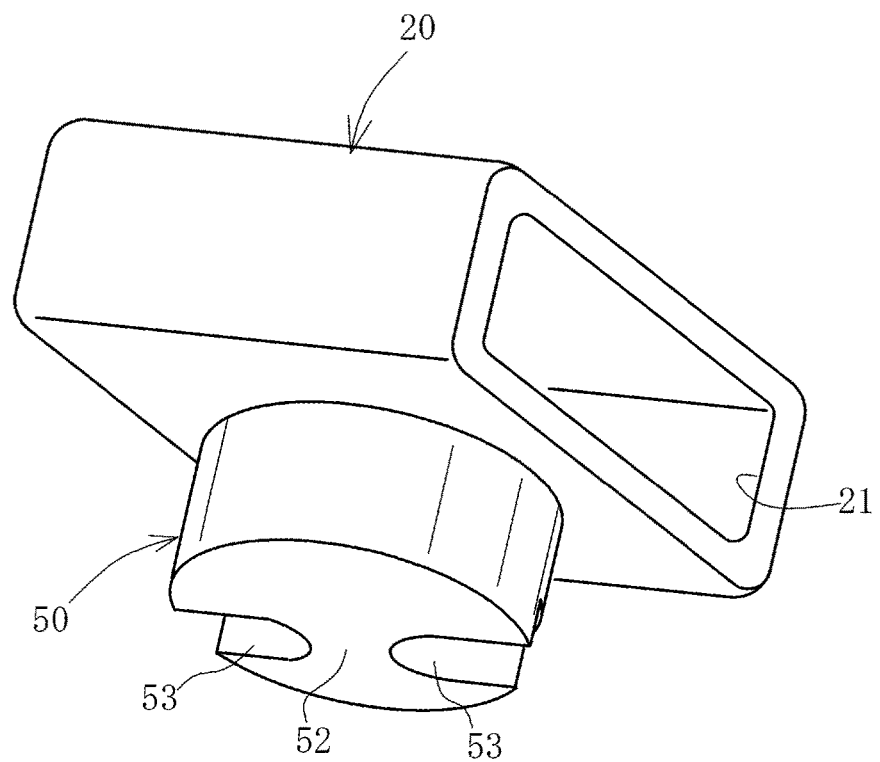
FIG. 5 is a perspective view of a first mounting metal fitting.
Figure 6:
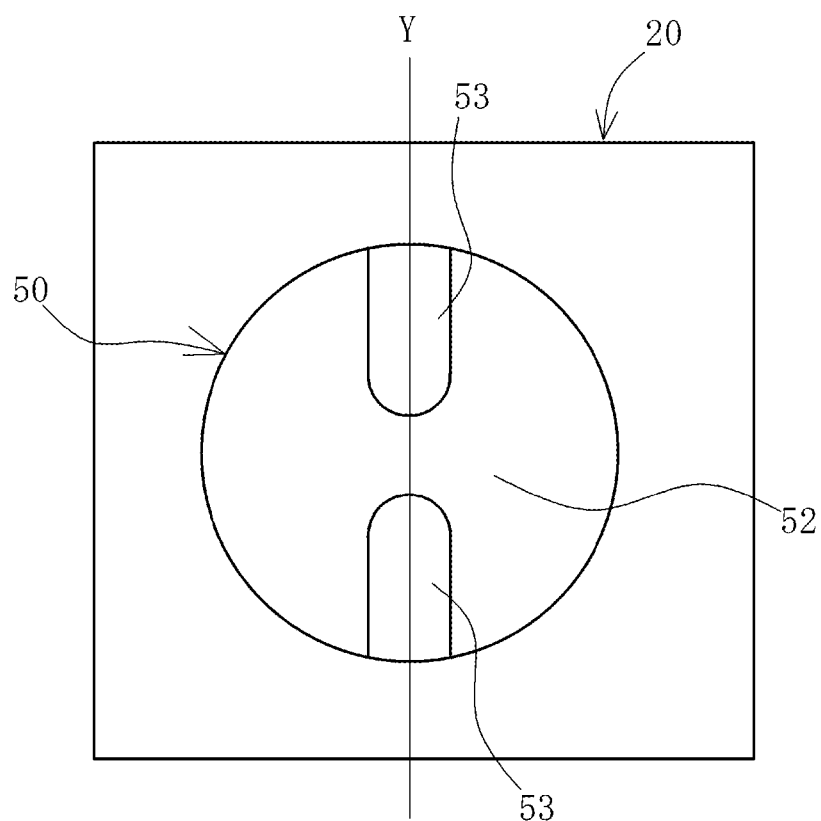
FIG. 6 is a bottom plan view of a projecting section.

FIG. 5 is a perspective view of the first mounting metal fitting 20, and FIG. 6 is a bottom plan view of the projecting section 50. In these drawings, the projecting section 50 is a circular cylindrical projection which projects continuously and integrally from a middle of a lower surface of the first mounting metal fitting 20. A pair of spring adjustment recesses 53 is formed on both sides in the Y direction of a lower surface 52 of the projecting section 50. The spring adjustment recesses 53 extend from a radially outward position to a radially inward position in the Y direction and are open outwardly in the radial direction. In addition, each lower side of the spring adjustment recesses 53 is also open. Each of the spring adjustment recesses 53 is closed and terminated at a middle side of the lower surface 52.

The projecting section 50 is inserted into the connecting section 32. A portion of the connecting section 32 is filled into the spring adjustment recesses 53 so as to form spring adjustment portions 32*a* (see FIG. 3). Herein, the spring adjustment portion 32*a* is also a portion of the connecting section 32, namely a portion of the elastic leg 33.

Figure 7:
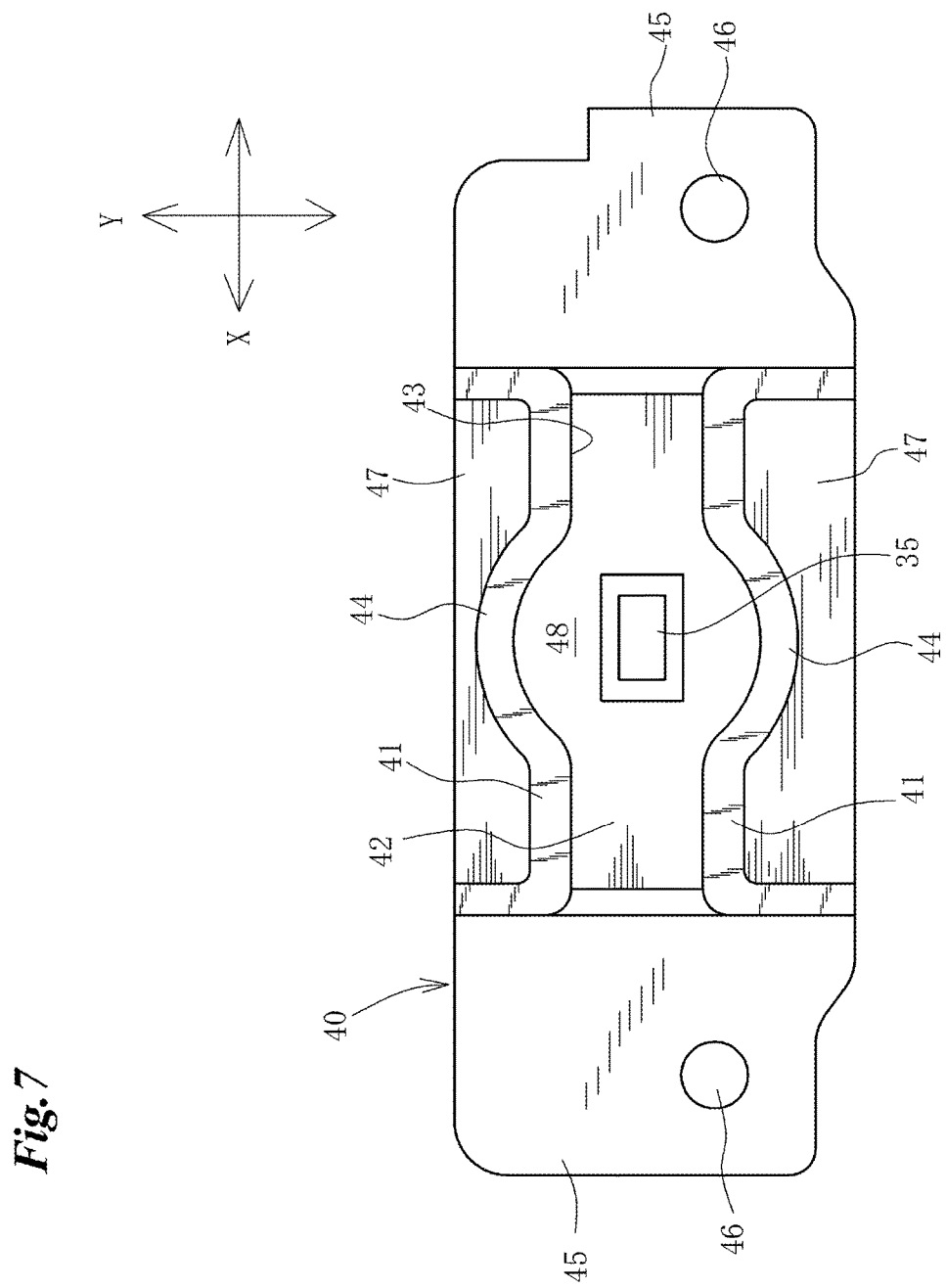
FIG. 7 is a top plan view of a second mounting metal fitting.

FIG. 7 is a top plan view (a view in the Z direction) of the second mounting metal fitting 40. As shown in this drawing, the upwardly extending wall sections 41 are formed along the X direction as a pair of opposed walls in the Y direction. Between the upwardly extending wall sections 41, there is formed a recess 43 which is surrounded by each of the upwardly extending wall sections 41 and the bottom section 42 and is open in each of the upward direction and the X direction. This recess 43 located between the upwardly extending wall sections 41 is expanded in the middle portion in the X direction. Namely, in a plan view, the middle portions in the X direction of the upwardly extending wall sections 41 are expanded outwardly in the Y direction so as to form circular arc-shaped expanded recess portions 44. These expanded recess portions 44 are an example of an X direction regulating means of the present invention. The pair of expanded recess portions 44 opposed to each other in the Y direction is configured to form a substantially circular expanded portion 48 in between.

As shown in FIG. 3, the projecting section 50, the void 34, the lower stopper 35 and the like are configured to be accommodated in the expanded portion 48.

By the way, although in FIG. 3 the projecting section 50 is located above the upwardly extending wall sections 41, this drawing shows a state before the static load of the engine is imposed on it. Therefore, when the engine is mounted, the first mounting metal fitting 20 and the projecting section 50 are moved downwardly to enter the inside of the expanded recess portions 44 and overlap with the upwardly extending wall sections 41 in the X and Y direction. At that time, a portion of each of the elastic legs 33 containing the connecting section 32 also enters the inside of the expanded recess portions 44.

Figure 8:
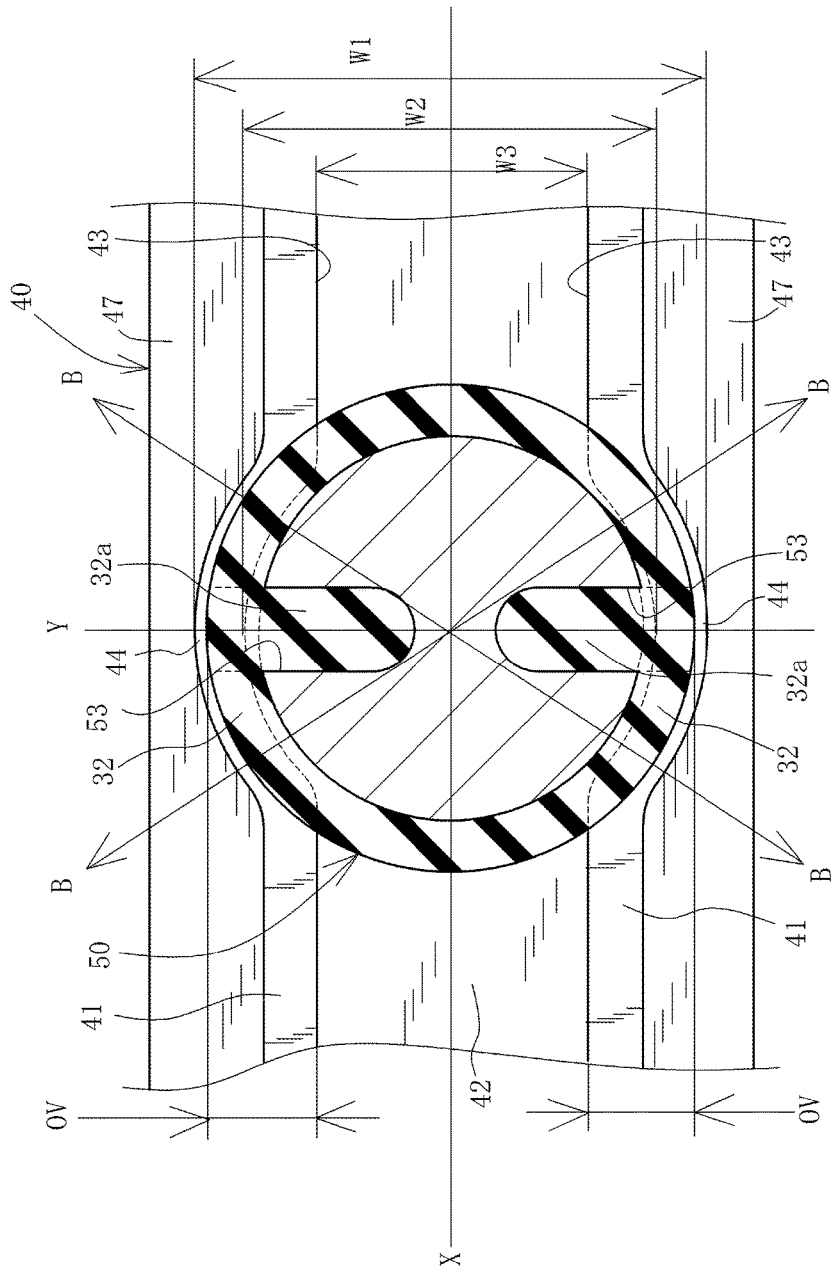
FIG. 8 is a cross sectional view showing a state in which the projecting section has entered an expanded portion.

FIG. 8 is a view showing a state in which the projecting section 50 has entered the expanded portion 48 and in which the projecting section 50 shown in cross section is located between the expanded recess portions 44 of the second mounting metal fitting 40 in a state of FIG. 7. With respect to the projecting section 50, a region corresponding to the cross section taken on line 8-8 of FIG. 3 is shown. Since the expanded recess portions 44 and the recess 43 located between the upwardly extending wall sections 41 are inclined in such a way as to spread in the Y direction toward the upper side respectively, they have different spaces between each upper part and each lower part thereof. Letting the largest upper space (width) between uppermost portions of the opposed expanded recess portions 44 be W1, and the largest lower space (width) between lowermost portions thereof be W2, the largest lower space W2 is smaller than the largest upper space W1.

A lower space W3 which is a space between lowermost portions of general portions of the recess 43 located between the upwardly extending wall sections 41 is smaller than the largest lower space W2. A mutual size relationship of W1, W2 and W3 is set W3<W2<W1.

Therefore, when the connecting section 32 (a portion of the elastic leg 33) enters the insides of the expanded recess portions 44, the projecting section 50 overlaps with the expanded recess portions 44 when viewed in the X direction). Herein, the mode of overlap contains a state in which a space between the projecting section 50 and each of the expanded recess portions 44 becomes 0 (zero).

In this state, when the projecting section 50 moves in the Y direction, the elastic member of the connecting section 32, namely, a portion of each of the elastic legs 33 is compressed by the expanded recess portions 44. Moreover, when the projecting section 50 moves in the X direction, the portions of the elastic legs 33 are compressed in the vicinity of connecting regions between the recess 43 and both ends in the X direction of the expanded recess portions 44 (namely, in the vicinity of the smallest width portion of the expanded recess portions 44).

Further, when the projecting section 50 moves in the oblique direction as indicated by arrows B, the portions of the elastic legs 44 are pressed to intermediate regions between the largest width portion and the smallest width portion of the expanded recess portions 44.

Next, the operation will be described.

Figure 2:
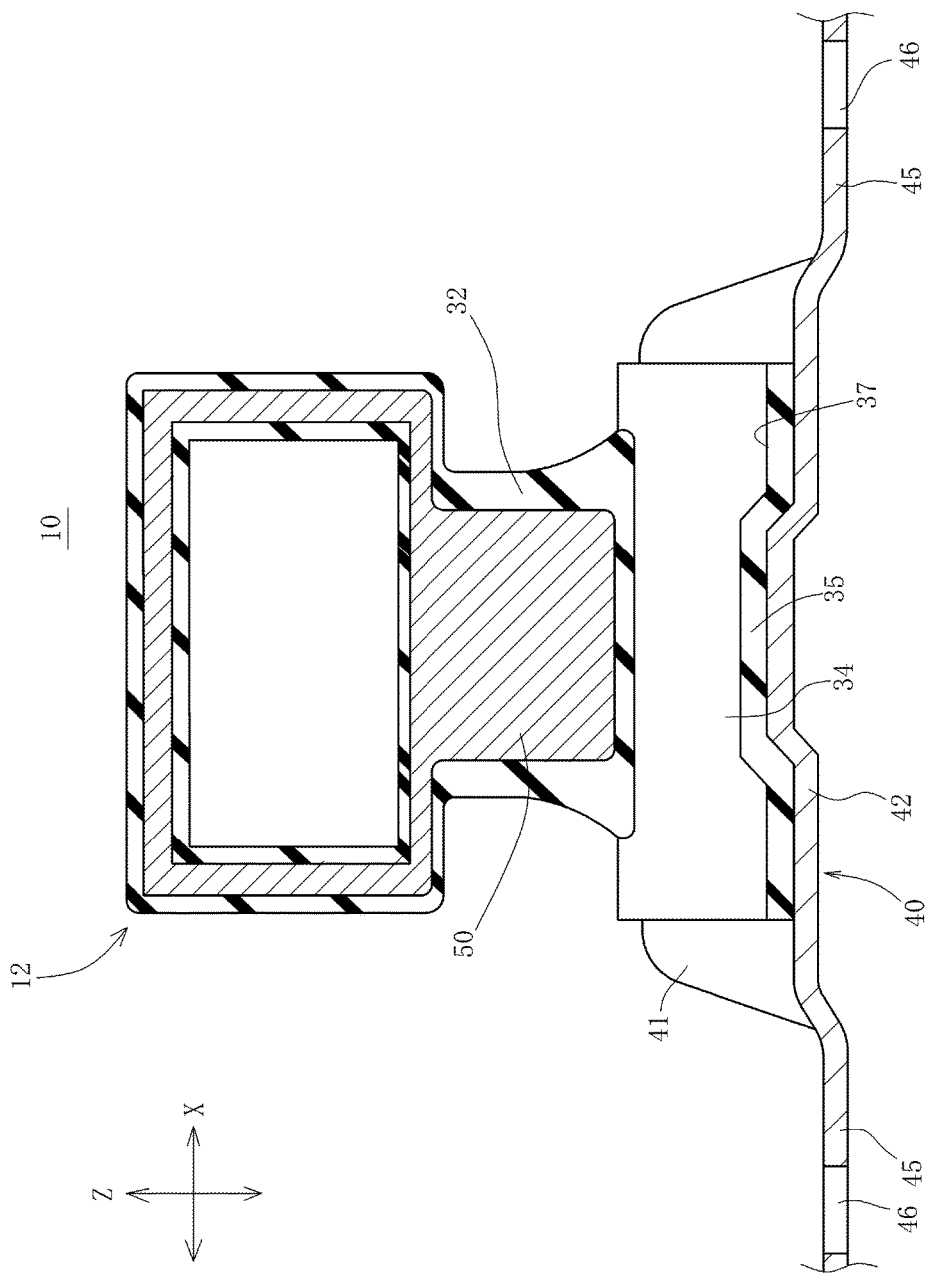
FIG. 2 is a cross sectional view taken on line 2-2 of FIG. 1.

Referring to FIGS. 2 and 3, when the first mounting metal fitting 20 is mounted on the engine, the first mounting metal fitting 20 and the projecting section 50 moves downwardly while allowing the elastic legs 33 to be elastically deformed by the static load of the engine, so that the projecting section 50 enters the insides of the expanded recess portions 44. In this state, when the vibration is transmitted from the engine to the first mounting metal fitting 20, the first mounting metal fitting 20 and the projecting section 50 are moved upwardly and downwardly while elastically deforming the elastic legs 33. At that time, the elastic legs 33 are subject mainly to the shear deformation. In addition, the connecting section 32 is elastically deformed mainly by the shear deformation. When the larger vibration is inputted, the projecting section 50 is moved downwardly in a large way while crushing the void 34 and is brought into contact with the lower stopper 35 whereby to buffer bottom collision against the bottom section 42.

Further, since the width in the Y direction between the expanded recess portions 44 is widened at the entering side of the projecting section 50 by tilting the upwardly extending wall sections 41, the advancing and retreating movement in the Z direction of the projecting section 50 can be easily performed between the opposed upwardly extending wall sections 41.

When the vibration is inputted in the Y direction, as shown in FIG. 3, the elastic legs 33 are moved while being elastically deformed between the upwardly extending wall sections 41 located on opposite sides thereof. At that time, since each of the expanded recess portions 44 of the upwardly extending wall sections 41 on the opposite side has a concavely curved surface along the projecting section 50, the elastic legs 33 are elastically deformed mainly by compressive deformation compressed between the projecting section 50 and each of the upwardly extending wall sections 41, so that the spring constant in the Y direction can be increased and the spring value in the Y direction can be controlled.

When the vibration is inputted in the X direction, the projecting section 50 is about to move in the X direction. However, since as shown in FIG. 8, the projecting section 50 enters the insides of the expanded recess portions 44, the movement in the X direction of the projecting section 50 is regulated by the overlap with the expanded recess portions 44. Then, a portion of each of the elastic legs 33 is formed as the connecting section 32 around the periphery of the projecting section 50, and so this elastic material portion of the connecting section 32 is compressively deformed between the expanded recess portions 44 and the projecting section 50. Thus, since the compressive deformation is added to the shear deformation, the spring constant in the X direction can be more increased, and it is possible to surely prevent the movement in the X direction of the first mounting metal fitting 20 beyond the predetermined level.

Like this, since the expanded recess portions (the X direction regulating means) 44 for regulating the movement in the X direction of the projecting section 50 are integrally provided on the second mounting metal fitting 40, the movement of the first mounting metal fitting 20 can be regulated without provision of the separate outside stopper 111 (FIG. 13).

For this reason, the X direction elastic leg 135 (FIG. 13) connected to the outside stopper 111 can be dispensed with. The vibration isolating elastic body 30 is required only to be connected to the second mounting metal fitting 40 in the Y direction. Thus, since the vibration isolating elastic body 30 is not required to be connected to outside stopper, the manufacture at the time the vibration isolating elastic body 30 is formed integral with the first mounting metal fitting 20 and the second mounting metal fitting 40 can be facilitated. Then, the vibration isolating elastic body 30 is able to be integrally formed with the expanded recess portions 44 in a state that the void (the space) 34 is open in the X direction, so that the demolding can be carried out in one direction and the construction of the metal mold can be simplified Further, since the X direction regulating section 44 is provided integral with the second mounting metal fitting 40, and the outside stopper 111 provided separately from the second mounting metal fitting 40 is dispensable, the number of component parts can be reduced and the device can be compactified, whereby the assembly on the side of the second mounting metal fitting 40 can be facilitated.

Moreover, only the expanded recess portions 44 are provided as the X direction regulating means, and the construction can be simplified. In addition, since the expanded recess portions 44 are provided integral with the second mounting metal fitting 40, the number of component parts can be reduced and the device can be compactified, whereby the assembly on the side of the second mounting metal fitting 40 can be facilitated.

Further, since the expanded recess portion (the X direction regulating means) 44 is provided in pairs in an opposed relationship when viewed in the Z direction and overlaps with the projecting section (50) when viewed in the X direction, the movement in the X direction of the projecting section 50 can be regulated certainly.

Moreover, a portion of each of the elastic legs 33 is integrally provided as the connecting section 32 at the periphery of the projecting section 50 interposed between the expanded recess portions 44. Therefore, when the projecting section 50 is moved, the elastic legs 33 located around the projecting section 50 are compressed between the projecting section 50 and the expanded recess portions 44. Accordingly, since the compression deformation is applied, the spring constant in the X direction can be increased, and it is possible to control the spring value.

Next, when the vibration is applied in the direction of arrows B of the FIG. 8, namely, in the oblique direction relative to the X and Y directions, the elastic legs 33 are pressed against the circular arc-shaped curved surfaces, in a plan view, of the expanded recess portions 44. Then, since the compressive deformation and the shear deformation are produced in the elastic legs 33, the spring constant can be increased also in this case. Moreover, since the expanded recess portions 44 are of circular arc shape, the elastic legs 33 can be compressively deformed steadily even if the angles in the direction of arrows B are changed.

Namely, the expanded recess portions (the X direction regulating means) 44 are formed with the outwardly expanded recess portions 44 in the Y direction. Therefore, even if the projecting section 50 interposed between the expanded recess portions 44 is moved in the oblique direction intersecting with the X and Y directions or either of the X direction or the Y direction, the movement can be regulated steadily. In addition, the compressive deformation of the connecting section 32 can be produced between the projecting section 50 and the expanded recess portions 44, and the spring constant can be increased with respect to the vibrations in the X and Y directions and in the oblique direction.

Further, the spring adjustment recess 53 is provided on the lower surface 52 of the projecting section 50. The spring adjustment portion 32a formed by being filled with a portion of the elastic leg 33 is located in the spring adjustment recess 53. The spring adjustment recess 53 extends radially in the Y direction in a large way and is open outwardly in the radial direction. With this construction, the spring constants in each of the X, Y and Z directions can be changed. Namely, in the Z direction, the spring constant is lowered due to the spring adjustment portion 32a of the connecting section 32 located in the spring adjustment recess 53 with increase in volume of the elastic leg 33.

On the other hand, with respect to the vibration in the Y direction, the spring adjustment portion 32a of the connecting section 32 entering the interior of the spring adjustment recess 53 is compressed by the terminated portion of the spring adjustment recess 53 located on the middle side of the bottom surface 52. Therefore, the spring constant can be slightly increased.

With respect to the vibration in the X direction, the spring adjustment portion 32a of the connecting section 32 entering the interior of the spring adjustment recess 53 is hardly deformed. Therefore, the spring constant is not influenced.

For this reason, the spring constants in the three directions of X, Y and Z can be adjusted by such a simple construction as to provide the spring adjustment recess 53 and to provide the spring adjustment portion 32a in the interior of the spring adjustment recess 53.

Figure 9:
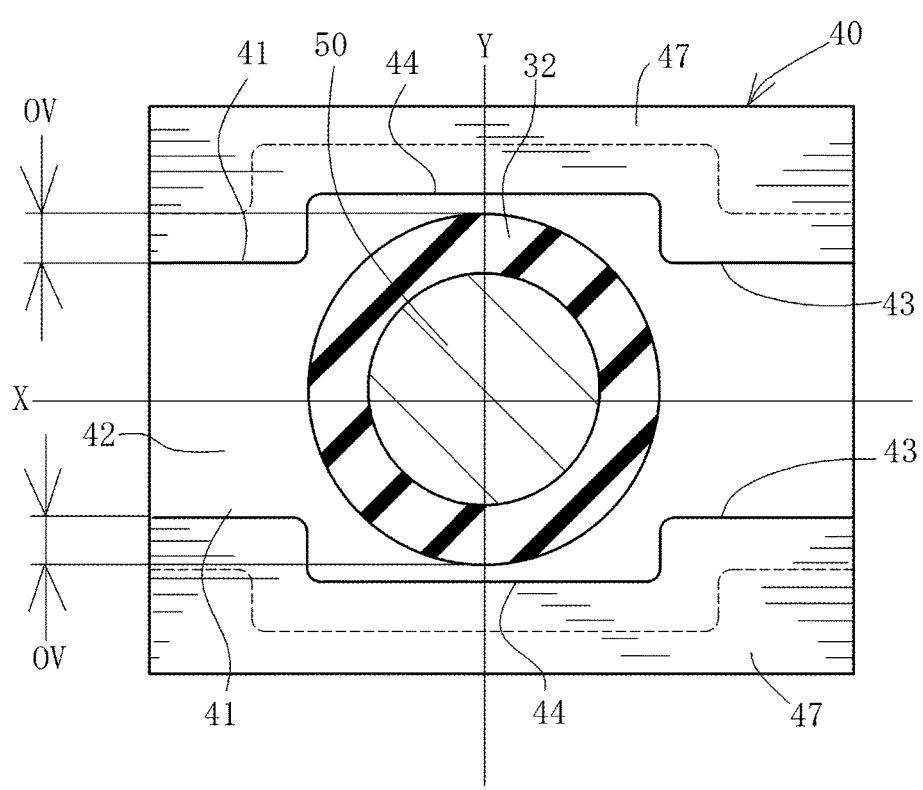
FIG. 9 is a cross sectional view similar to FIG. 8 in accordance with a second embodiment.

FIG. 9 is a view showing the same part as FIG. 8, in accordance with another embodiment (second embodiment). Herein, like elements are given like reference characters with respect to the construction corresponding to the previously described embodiment (first embodiment), and the explanation will not be repeated (the same applies to embodiments to be referred to later).

In this embodiment, the expanded recess portions 44 are not formed in a circular arc shape but formed in the shape of a rectangular recess bent in substantially a U-shape. With this configuration, the expanded recess portions 44 overlap with the projecting section 50 in the X direction, and similarly to the previous embodiment, can regulate the movement in the X direction of the projecting section 50 effectively.

Figure 10:
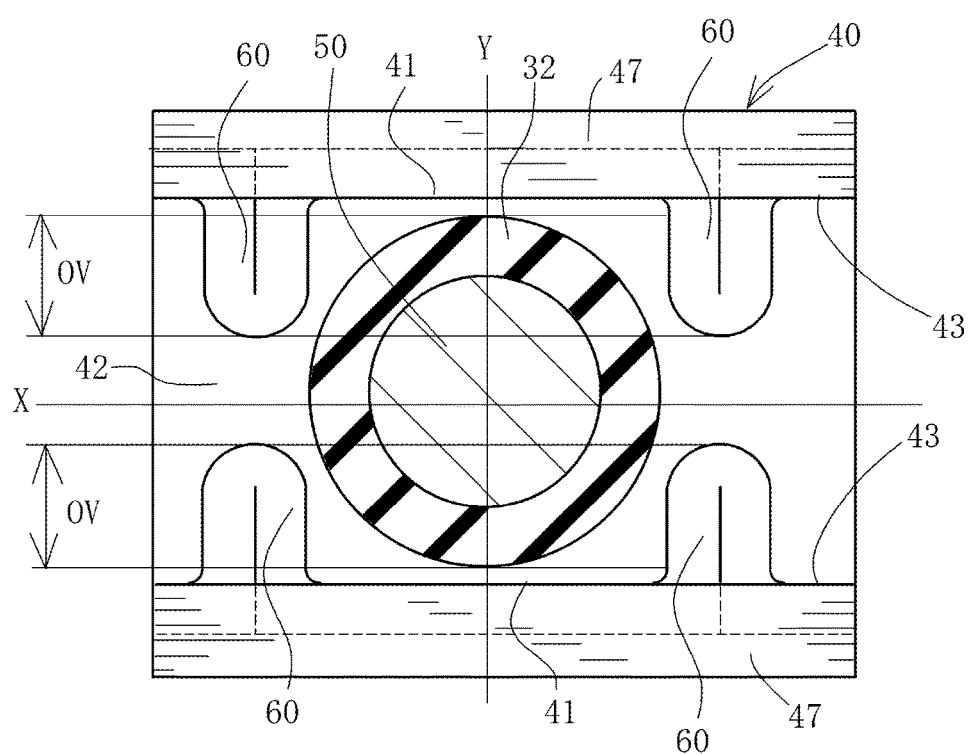
FIG. 10 is a cross sectional view similar to FIG. 8 in accordance with a third embodiment.

By the way, the upwardly extending wall sections 41 are formed on parallel vertical planes extending in the Z direction (the same applies to FIG. 10).

Like this, when the upwardly extending wall sections 41 extend in the vertical direction, the width in the Y direction between the expanded recess portions 44 becomes constant in the Z direction. Therefore, even if the projecting section 50 has such a simple form that an outer circumference facing the upwardly extending wall sections 41 extends vertically, the relationship between the projecting section 50 and the upwardly extending wall sections 41 is maintained constant irrespective of an amount of advancing and retreating movement in the Z direction of the projecting section 50, so that the regulation of the movement in the X direction can be carried out at a constant level.

FIG. 10 is a view showing the same part as FIG. 9, in accordance with still another embodiment (third embodiment).

In this embodiment, the X direction regulating means is formed as regulating projections 60 which extend from the opposed upwardly extending wall sections 41 in the Y direction within the recess 43 located between the upwardly extending wall sections 43. The regulating projections 60 are formed in pairs at a certain interval in the X direction. The projecting section 50 is interposed between the opposed regulating projections 60 in the X direction and overlaps with the regulating projections 60 in the X direction. With this construction, the movement in the X direction can be regulated effectively in a similar manner to each of the previous embodiments.

The regulating projections 60 may be formed integral with or separate from the upwardly extending wall sections 41. In the case of being separately formed, separate elements are mounted on the upwardly extending wall section 60 on one side by welding or the like in such a way as to project towards the upwardly extending wall section 41 on the other side. Alternatively, the elements which are separately provided from the upwardly extending wall sections 41 may be mounted at each lower end thereof on the bottom section 42, and each upper part of the elements is configured to extend upwardly from the bottom section 42.

Further, in the embodiments as shown in FIGS. 9 and 10, the projecting section 50 has a circular cross section similar to the first embodiment, and a portion of the projecting section 50 can always come in contact with a wall surface of the expanded recess portions 44 even if the movement direction of the projecting section 50 is inclined in relation to the X and Y directions. However, the projecting section 50 may be formed in a noncircular cross section such as a square cross section or the like.

Further, although the elastic member of the connecting section 32 is provided around the whole circumference of the projecting section 50, it may be provided partially only at an overlapping area. With this construction, the amount of the elastic member used can be reduced and the whole device can be lightened in weight. In addition, the direct contact between the hard parts made of metal or the like is prevented at the overlapping area, so that the creation of noises can be suppressed.

Figure 11:
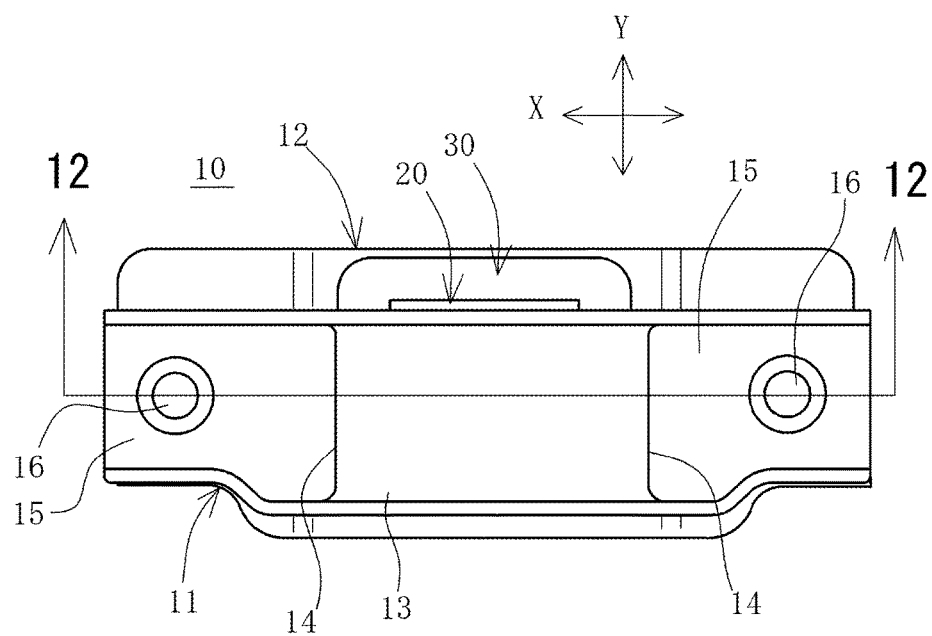
FIG. 11 is a top plan view similar to FIG. 1 in accordance with a fourth embodiment.
Figure 12:
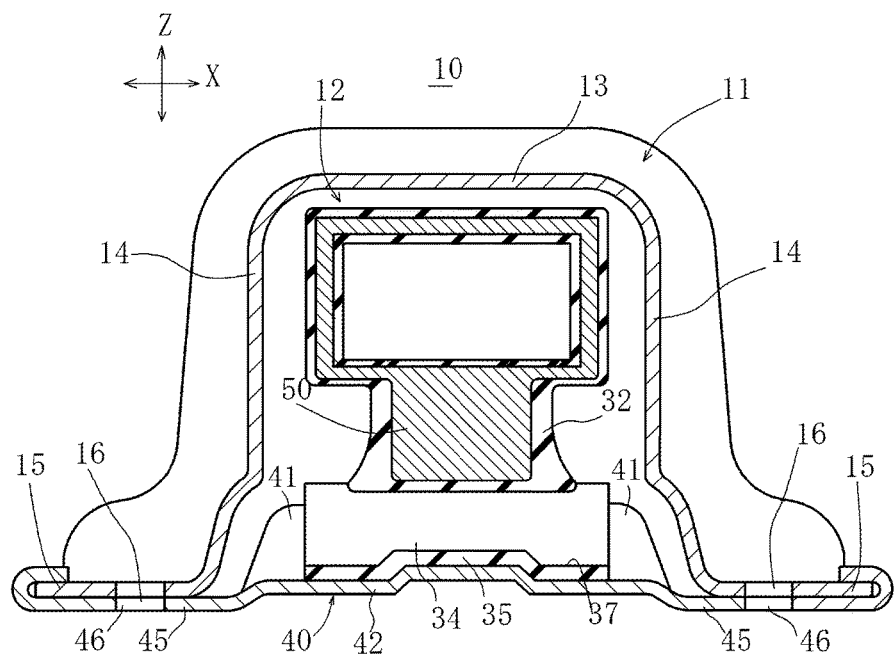
FIG. 12 is a cross sectional view similar to FIG. 2 in accordance with the fourth embodiment.

FIGS. 11 and 12 show a fourth embodiment, wherein FIG. 11 corresponds to FIG. 1 and FIG. 12 corresponds to FIG. 2.

In this embodiment, an outside stopper 11 is provided relative to the mount main body part 12.

The outside stopper 11 is a metal fitting which is integrally formed with a center section of substantially an inverted U-shape consisting of a top portion 13 and lateral portions 14 which surround the first mounting metal fitting 20 in the X direction, and with mounting flanges 15 bent from lower ends of the lateral portions 14 in the opposite directions separated apart from each other. When the first mounting metal fitting 20 is moved excessively in the X direction or moved in the Z direction in a large way, the outside stopper 11 functions as a stopper for regulating such movement of the first mounting metal fitting 20. A mounting hole 16 is formed in each of the mounting flanges 15.

As shown in FIG. 12, the mounting flanges 15 are placed on mounting sections 45 formed by end parts in the longitudinal direction of the second mounting metal fitting 40 and are integrated therewith by a proper method (by caulking, in this example). The mounting holes 16 are in alignment with mounting holes 46, and the mounting flanges 15 are mounted on the vehicle body by bolts (not shown in the drawing) which pass through these mounting holes 16 and 46. The outside stopper 11 functions as a constituent member of the second mounting metal fitting 40 by being integrated with the second mounting metal fitting 40.

With provision of this outside stopper 11, the upward excessive vibration input is prevented by allowing the first mounting metal fitting 20 to be brought into contact with the top portion 13.

Further, at the time of inputting such an excessive vibration that the first mounting metal fitting 20 on the upper side is moved in an even more inclined fashion in a state in which the projecting section 50 is regulated by the X direction regulating means such as the expanded recess portions 44 or the like, the first mounting metal fitting 20 makes contact with the lateral portions 14, and the outside stopper 11 prevents the first mounting metal fitting 20 from further inclination whereby the excessive movement can be regulated.

At that time, the elastic cover 31 which covers the first mounting metal fitting 20 is configured to buffer an impact when the first mounting metal fitting 20 moves upwardly in the drawing thereby to make contact with the top portion 13. In addition, the elastic cover 31 also buffers an impact when the first mounting metal fitting 20 is moved excessively in the X direction thereby to make contact with the lateral portions 14.

Like this, also in the case where the projecting section 50 is regulated by the X direction regulating means such as the expanded recess portions 44 or the like, the outside stopper 11 can be provided for preventing the excessive movement, and the excessive movement can be regulated more steadily by the outside stopper 11.

Namely, the outside stopper 11 is provided for regulating unusual excessive deformation which is not able to be regulated by the X direction regulating means such as the expanded recess portions 44 or the like. The usual movement in the X direction can be regulated by the X direction regulating means.

For this reason, the outside stopper 11 is provided additionally, and the vibration isolating elastic body 30 is separated from the outside stopper 11 without combination with the latter and is removable from the mount main body part 12.

As a result, upper elastic legs (see X direction elastic legs 135 in FIG. 13) which provide a connection between the first mounting metal fitting 20 and the outside stopper 11 are not required to be provided in the vibration isolating body 30, so that the whole device can be reduced in weight by dispensing with the upper elastic legs.

What is claimed is:

1. A vibration isolating device comprising:
a first mounting metal fitting to be mounted on one of a vibration source and a vibration receiving side;
a second mounting metal fitting to be mounted on the other of the vibration source and the vibration receiving side; and
a vibration isolating elastic body providing a connection between the first mounting metal fitting and the second mounting metal fitting;
wherein, letting a direction of a static load applied to the first mounting metal fitting be Z, and two mutually intersecting directions in a plane orthogonal to the Z be X and Y, and letting the Y correspond to a direction of a mounting axis of the first mounting metal fitting, the vibration isolating elastic body has a pair of elastic legs which extends in the Y direction in a bifurcated form from the first mounting metal fitting, and extending end portions of the elastic legs are connected to upwardly extending wall sections which are formed in both end portions in the Y direction of the second mounting metal fitting;
wherein the elastic legs located on the first mounting metal fitting side are connected to each other, and a projecting section integrally projecting from the first mounting metal fitting is inserted into a connecting section of the elastic legs;
wherein the upwardly extending sections are formed along the X direction as a pair of opposed walls in the Y direction, and middle portions in the X direction of the upwardly extending wall sections are expanded outwardly in the Y direction so as to form a pair of expanded recess portions opposed in the Z direction;
wherein the projecting section is arranged between the pair of upwardly extending wall sections when viewed in the Y direction, and the projecting section is located above the upwardly extending wall sections in a state before the static load is imposed on it, and enters the inside of the expanded recess portions to overlap with the upwardly extending wall sections when viewed in the X direction when the static load is imposed on it;
wherein the expanded recess portions regulate a movement in the Y direction of the projecting section in a static load imposed state and are configured as an X direction regulating means for regulating a movement in the X direction of the projecting section, and the second mounting metal fitting is integrally provided with the X direction regulating means; and
wherein the pair of elastic legs is arranged in an opposed relationship across a space, the space is formed in a position below the projecting section and passes through the vibration isolating elastic body in the X direction to open in the X direction, and the vibration isolating body is formed integral with the first mounting metal fitting and the second mounting metal fitting.

2. The vibration isolating device according to claim 1, wherein a portion of the elastic leg is integrally provided at a periphery of the projecting section interposed between the expanded recess portions.

3. A vibration isolating device comprising:
a first mounting metal fitting to be mounted on one of a vibration source and a vibration receiving side;
a second mounting metal fitting to be mounted on the other of the vibration source and the vibration receiving side; and
a vibration isolating elastic body providing a connection between the first mounting metal fitting and the second mounting metal fitting;
wherein, letting a direction of a static load applied to the first mounting metal fitting be Z, and two mutually intersecting directions in a plane orthogonal to the Z be X and Y, and letting the Y correspond to a direction of a mounting axis of the first mounting metal fitting, the vibration isolating elastic body has a pair of elastic legs which extends in the Y direction in a bifurcated form from the first mounting metal fitting, and extending end portions of the elastic legs are connected to upwardly extending wall sections which are formed in end portions in the Y direction of the second mounting metal fitting;
wherein the elastic legs located on the first mounting metal fitting side are connected to each other, and a projecting section integrally projecting from the first mounting metal fitting is inserted into a connecting section of the elastic legs;
wherein the projecting section is arranged between the pair of upwardly extending wall sections, and the second mounting metal fitting is integrally provided with an X direction regulating means for regulating a movement in the X direction of the projecting section; and,
wherein a portion of the elastic leg is integrally provided at a periphery of the projecting section interposed between the expanded recess portions;
said vibration isolating device further comprising a spring adjustment recess provided on a lower surface of the projecting section, said spring adjustment recess is arranged in the Y direction and is open outwardly in the Y direction at a bottom side of the second mounting metal fitting, and a spring adjustment portion formed by being filled with a portion of the elastic leg is located in the spring adjustment recess.

4. The vibration isolating device according to claim 1, wherein the upwardly extending wall sections are inclined in cross section in the Y direction such that a width in the Y direction between the expanded recess portions is increased on an entering side of the projecting section.

5. The vibration isolating device according to claim 1, wherein the upwardly extending wall sections extend vertically in cross section in the Y direction such that a width in the Y direction between the expanded recess portions is constant.

6. The vibration isolating device according to claim 2, wherein the upwardly extending wall sections are inclined in cross section in the Y direction such that a width in the Y direction between the expanded recess portions is increased on an entering side of the projecting section.

7. The vibration isolating device according to claim 2, wherein the upwardly extending wall sections extend vertically in cross section in the Y direction such that a width in the Y direction between the expanded recess portions is constant.

8. The vibration isolating device according to claim 3, wherein the upwardly extending wall sections are inclined in cross section in the Y direction such that a width in the Y direction between the expanded recess portions is increased on an entering side of the projecting section.

9. The vibration isolating device according to claim 3, wherein the upwardly extending wall sections extend vertically in cross section in the Y direction such that a width in the Y direction between the expanded recess portions is constant.

10. The vibration isolating device according to claim 2, further comprising a spring adjustment recess provided on a lower surface of the projecting section, wherein the spring adjustment recess is arranged in the Y direction and is open outwardly in the Y direction at a bottom side of the second mounting metal fitting, and a spring adjustment portion formed by being filled with a portion of the elastic leg is located in the spring adjustment recess.

11. The vibration isolating device according to claim 10, wherein the upwardly extending wall sections are inclined in cross section in the Y direction such that a width in the Y direction between the expanded recess portions is increased on an entering side of the projecting section.

12. The vibration isolating device according to claim 10, wherein the upwardly extending wall sections extend vertically in cross section in the Y direction such that a width in the Y direction between the expanded recess portions is constant.

* * * * *

UNITED STATES PATENT AND TRADEMARK OFFICE
CERTIFICATE OF CORRECTION

PATENT NO. : 9,926,999 B2
APPLICATION NO. : 15/102942
DATED : March 27, 2018
INVENTOR(S) : Hirokazu Kadowaki Page 1 of 1

It is certified that error appears in the above-identified patent and that said Letters Patent is hereby corrected as shown below:

On the Title Page

Item (54) and in the Specification, Column 1, Line 1:
Change "VIBRATING ISOLATING DEVICE" TO --VIBRATION ISOLATING DEVICE--.

Signed and Sealed this
Twenty-sixth Day of June, 2018

Andrei Iancu
*Director of the United States Patent and Trademark Office*